United States Patent [19]

Ryder

[11] Patent Number: 5,107,616
[45] Date of Patent: Apr. 28, 1992

[54] FISHING RELEASE CLIP

[75] Inventor: Francis E. Ryder, Arab, Ala.

[73] Assignee: Ryder International Corporation, Arab, Ala.

[21] Appl. No.: 628,099

[22] Filed: Dec. 13, 1990

[51] Int. Cl.⁵ .................................. A01K 91/06
[52] U.S. Cl. ........................................ 43/43.12
[58] Field of Search .............. 43/43.12, 42.72, 27.4, 43/44.88; 280/449

[56] References Cited

U.S. PATENT DOCUMENTS

| 2,730,832 | 1/1956 | Mathers | 43/42.72 |
| 2,858,637 | 11/1958 | Stark | 43/43.12 |
| 2,907,134 | 10/1959 | Trautvetter | 43/43.12 |
| 4,012,863 | 3/1977 | Lori | 43/43.12 |
| 4,069,611 | 1/1978 | Dusich | 43/43.12 |
| 4,173,091 | 11/1979 | Emory | 43/43.12 |
| 4,221,068 | 9/1980 | Roemer | 43/43.12 |
| 4,430,823 | 2/1984 | Henze | 43/43.12 |
| 4,656,776 | 4/1987 | Macachor | 43/43.12 |
| 4,817,328 | 4/1989 | Hartley | 43/43.12 |

Primary Examiner—Kurt Rowan
Attorney, Agent, or Firm—Trexler, Bushnell, Giangiorgi & Blackstone, Ltd.

[57] ABSTRACT

A release clip for use with big game fishing comprises a housing and a spool carrier, with the spool carrier being rotatably mounted on the housing. The spool carrier is capable of rotation between an open and a closed position. The spool carrier has a spool disposed about it where slack fishing line is wound, and the housing has a pad disposed about it that is capable of applying a soft compression to the slack line in order to keep the line in place, and to prevent the line from tangling. The relesase clip, when in the open position, releases the slack fishing line when a fish applies sufficient tension to the line, allowing the slack line to play off of the spool. The amount of line tension required to open the release clip can be set variably by a fisherman.

19 Claims, 2 Drawing Sheets

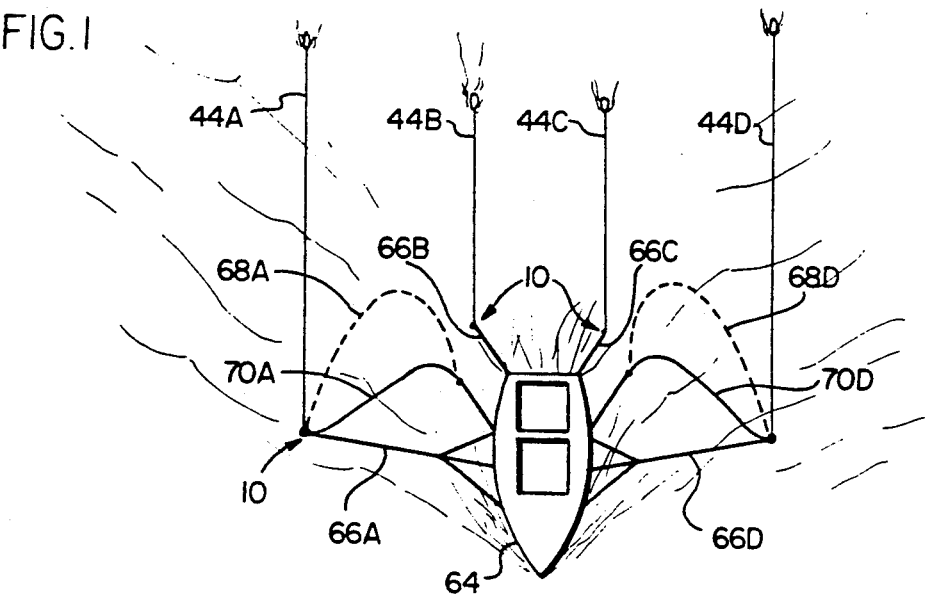
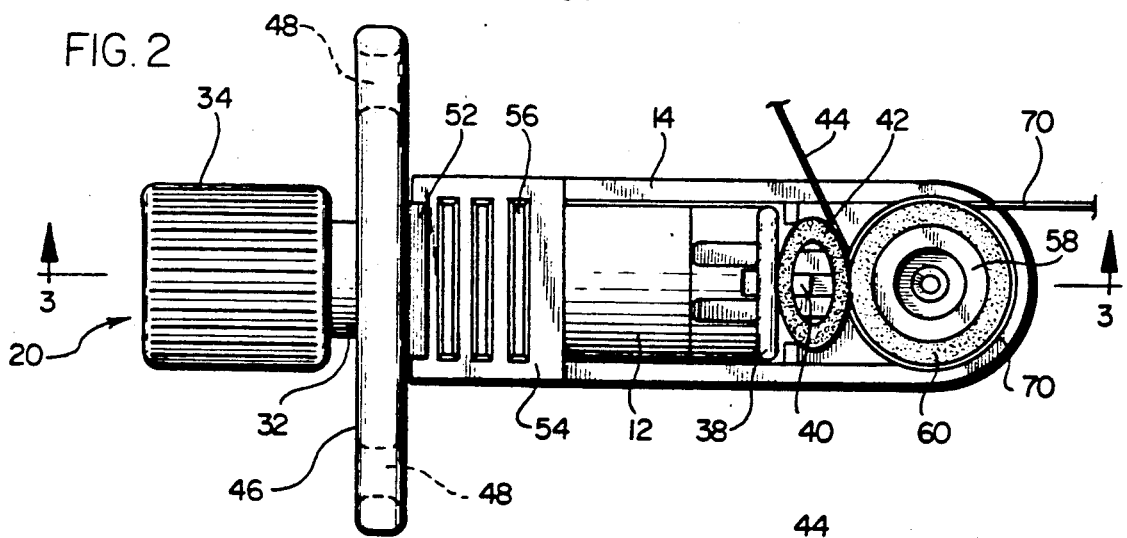
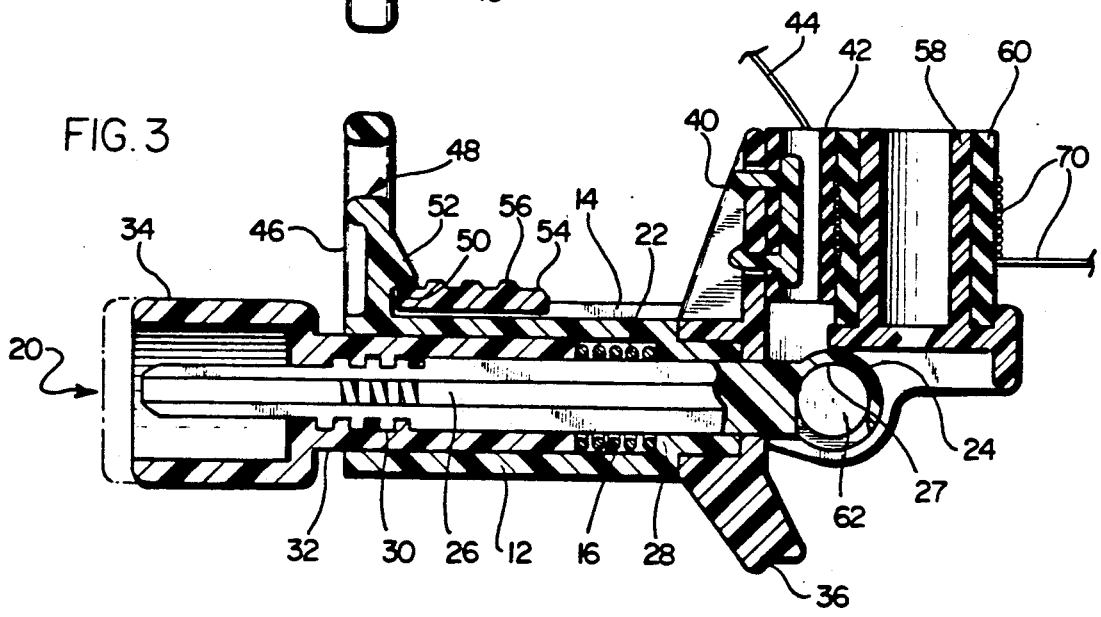

FISHING RELEASE CLIP

BACKGROUND AND SUMMARY OF THE INVENTION

This invention relates generally to an improved release clip for use with big game fishing. When fishing for big game, or trophy fish, commercial sports fishermen will troll with a plurality of lines trailing behind the boat, in an effort to increase the odds of catching a fish In order to prevent those multiple lines from becoming tangled, the lines are positioned away from the boat, in a direction substantially perpendicular to the direction of boat travel, by means of outriggers. By this method, the wake caused by the boat as it trolls through the water will keep the lines separate and prevent them from tangling.

At the outer ends of these outriggers, the respective fishing lines are attached to some form of a line release mechanism. When a fish takes the bait attached to the line, the line will be removed from the release mechanism. Therefore, it is necessary that the release mechanism be designed so that it will release the line when a fish strikes, but will hold the line in position against the forces created while the boat is trolling the bait through the water. In other words, the force holding the line to the release mechanism must be greater than the tension present in the line due to the trolling friction of the bait with the water, but less than the tension present in the line due to a fish taking the bait.

Further considerations regarding the amount of force imparted by the release mechanism upon the line are dictated by the line itself. Monofilament lines, consisting of nylon and the like, are used almost exclusively. These lines are quite strong, but their structural integrity is compromised to a great extent by the presence of any pinch, knot, or crimp in the line. Therefore, the release mechanism cannot hold the line with a force sufficient to deform, crimp, or in any way damage the line. When the line is deformed, by a release mechanism or other means, the line is weakened, and may break, when the fish begins to fight.

Furthermore, it is desirable to have a certain amount of slack in the line so that if a fish strikes, the line will be released from the release mechanism, but the bait will remain in place in the water with the fish. This feature, wherein slack in the line allows the bait to remain in place until the boat continues to move through the water, is referred to by some fisherman as "drop back." If the slack is not sufficient, it is possible that the trolling speed of the boat will pull the bait out of the mouth of the fish. Also, a degree of line slack is desirable because it gives the fishermen extra time to remove all other lines, so that there is no risk of tangling and there is adequate room in which to fight the fish. The slack also allows there to be a weak tension in the line when the fish strikes. This is desirable because if the fish strikes, and feels a strong tension in the line, the fish may spit out the bait.

In the past, this slack has been present in a bow of line located between the release mechanism and the boat. This method has become increasingly disfavored because it compromises the structural integrity of the line due to exposure of the line to the sea, the waves, and the wind. For these considerations, among others, the release mechanism used is an integral element of a successful big game fishing trip.

OBJECTS AND SUMMARY OF THE INVENTION

A general object of the invention is to provide an improvement in release clips for use with big game fishing.

Another object of the present invention is to provide a release clip which allows a fisherman to preset the amount of tension necessary to actuate the clip.

A further object of the invention is to provide a release clip that will not deform or damage the fishing line attached to it, but does not allow the line to slip off the clip unintentionally.

An object of the invention is to provide a release clip that will prevent tangling of fishing line.

Another object of the invention is to provide a release clip that possesses means for maintaining an appropriate amount of slack in the fishing line once the clip is actuated, so that the bait will remain properly with the fish, without the structural integrity of the line being jeopardized.

The release clip of the present invention embodies a significant improvement over the release clips of the prior art in that it is able to hold a fishing line, with a length of line wrapped around a spool to provide the line slack needed to attain "back drop" once the fish strikes. All of this is accomplished with a soft compression, imposed by a pad, that does not deform or damage the fishing line. When sufficient tension is imparted to the line, the release clip opens, and allows the slack line to play off the spool freely. The amount of tension in the fishing line required to open the clip is defined by a spring which can be compressed variably to change the magnitude of tension required. These improvements in the release clip, constructed according to the teachings of the present invention, can result in an increased percentage of fish strikes leading to caught fish, and greater enjoyment for big game sports fishermen.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 1 is a bird's-eye view of a trolling fishing boat using outriggers having release clips constructed according to the teachings of the present invention;

FIG. 2 is a top plan view of a release clip constructed according to the teachings of the present invention, showing the disposition of the clip in the closed position;

FIG. 3 is a cut-away sectional side view, taken along line 3—3 of FIG. 2, of the release clip showing the particular construction of the clip;

DETAILED DESCRIPTION OF THE PREFERRED EMBODIMENT

Figure 4:
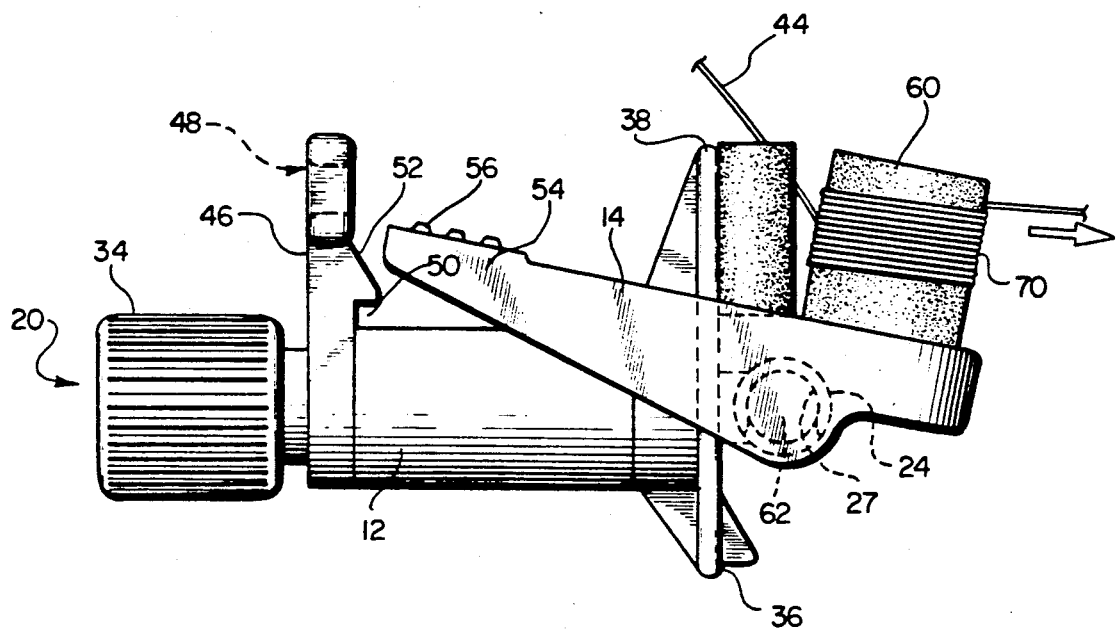
FIG. 4 is a side plan view of a release clip constructed according to the teachings of the present invention with the spool carrier pivoted with respect to the horizontal, showing the disposition of the clip as the spool carrier pivots from the closed to the open position.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

In FIG. 1, there is illustrated schematically a typical sport fishing arrangement, wherein a boat is trolling four or more lines utilizing a series of outriggers. The fishing release clip 10 of the present invention is mounted on the respective outriggers, as discussed more fully hereinafter, and positions or mounts the lines to the outriggers for trolling.

Referring generally to FIG. 2 and FIG. 3, a release clip 10, constructed according to the teachings of the present invention, for use with big game fishing is disclosed. The release clip 10 is comprised primarily of a housing 12, and a pivotally mounted spool carrier 14. The housing 12, and the spool carrier 14 are constructed of a lightweight material, such as plastic, so as not to add weight on the end of an outrigger of significant magnitude to cause deformation of the outrigger.

The housing 12 has a substantially cylindrical bore 16, of sufficient diameter in places to accept a T bolt 18, an internally threaded sleeve or barrel portion 32 of a knob 20, and a spring 22, centered about an axis of elongation of the housing 12. The T bolt 18 has a base 24 and a stem 26, with the stem 26 being longer than the base 24, and the base 24 being disposed substantially perpendicular to the stem 26. The base 24 extends away perpendicularly from each side of the stem 26. The base 24 has a substantially cylindrical smooth surface on one side. On the other side of the base 24, the base 24 is flattened to form a concave, smooth arcuate surface 27.

The stem 26 of the T bolt 18 is disposed inside, and communicates the entire length of the bore 16, with portions of the stem 26 being inside the bore 16, while the base 24 of the T bolt 18 is completely outside of the bore 16. The diameter of the bore 16 decreases at one end so that only the T bolt 18 is allowed to pass through the bore 18. This decrease in diameter forms a shoulder 28 against which the spring 22 can be compressed. The end of the stem 26 of the T bolt 18, remote from the base 24, has threads 30 formed thereon, and which are engaged with a sleeve 32 of the knob 20.

The knob 20 has a sleeve 32, and a handle 34 connected to the barrel 32. The barrel 32 is disposed substantially inside the bore 16, and the handle 34 is disposed outside of the bore 16. The handle 34 is constructed so that application of rotative force to the handle 34 can cause rotation of the sleeve 32. The sleeve 32 is internally threaded, and surrounds the stem 26 of the T bolt 18, and is engaged with the threads 30 of the stem 26. The spring 22 surrounds the stem 26 of the T bolt 18, and is disposed inside the bore 16 between the shoulder 28 and the sleeve 32 of the knob 20. With this construction, the threaded engagement of the sleeve 32 and the stem 26 of the T bolt 18 allow the spring 22 to be compressed variably between the shoulder 28 and the end of sleeve 32, as the sleeve 32 is advanced along the stem 26.

The housing 12, at one end, is elongated downwardly away from the bore 16 to form a stop portion 36, which restricts the rotation of the spool carrier 14, and supplies support to the spool carrier 14, as will be discussed below. Also at the same end, the housing 12 is elongated upwardly away from the bore 16 to form a pad mount 38 which is constructed so as to accept and hold securely a pad clip 40. The pad clip 40 is attached to and holds a hollow pad 42, which applies soft compression to a fishing line 44 to hold the fishing line 44 in place. The pad 42 is constructed of a soft, flexible material, such as polyurethane and the like. At the end of the housing 12 opposite to the stop portion 36 and the pad mount 38, the housing 12 is elongated upwardly away from the bore 16 to form a mounting portion 46 having a plurality of apertures 48 which allow the release clip 10 to be attached to an outrigger. At this end also, the housing 12 is elongated upwardly away from the bore 16 to form a notch 50 and a latch 52, or catch, with the latch 52 being disposed above the notch 50, and preferably, one edge of the notch 50 defining the latch 52. The notch 50 and the latch 52 form part of a locking mechanism which maintains the release clip 10 is the closed position, that is, with the spool carrier 14 positioned as shown in FIG. 2, and FIG. 3, as will be discussed herein.

The spool carrier 14 has a latch portion 54 which is constructed so as to be insertable into the notch 50, disposed on the housing 12, and held there by the latch 52. The latch portion 54 has ribs 56 which aid in the transformation of the release clip 10 from the open position to the closed position. Opposite to the latch portion 54, the spool carrier 14 is elongated upwardly to form a spool mount 58, upon which a spool 60 is disposed. The spool 60 has an outer layer, or covering, which is constructed of a soft, flexible material similar to that of the pad 42.

Below the spool mount 58, the spool carrier 14 is elongated inwardly to form cylindrical pivot pins 62 on each side of the spool carrier 14. The pivot pins 62 are of sufficient diameter so as to be received into the concave, smooth arcuate surface 27 of the base 24 of the T bolt 18, and maintained there. This allows the spool carrier 14 to be pivotally joined to the T bolt 18, and to pivot with respect to the T bolt 18 and the housing 12. The spool carrier 14 is capable, thusly, of rotation about the base 24 of the T bolt 18 between the open and closed positions of the release clip 10—FIG. 2 and FIG. 3 as compared with FIG. 5.

The operation of the above-disclosed structure will become evident in the following discussion. When a person goes big game fishing, he knows the type of fish he is seeking, and he is appraised of all the factors, as discussed above, necessary to have a successful big game fishing trip. Therefore, he knows approximately the amount of force that the fish will impart on the fishing line 44 when the fish strikes. Also, he knows approximately the amount of force that will be imparted on the fishing line 44 due to the trolling friction of bait with the water. Given this knowledge, the fisherman can approximate the amount of tension that must be present on the fishing line 44 in order for the release clip 10 to release the fishing line 44 when a fish strikes. Furthermore, the fisherman knows how fast he will be trolling, and how many outriggers 66 he will be using. Therefore, he knows approximately how much slack line 70 he will have to place on the spool 60 of the release clip 10.

Figure 5:
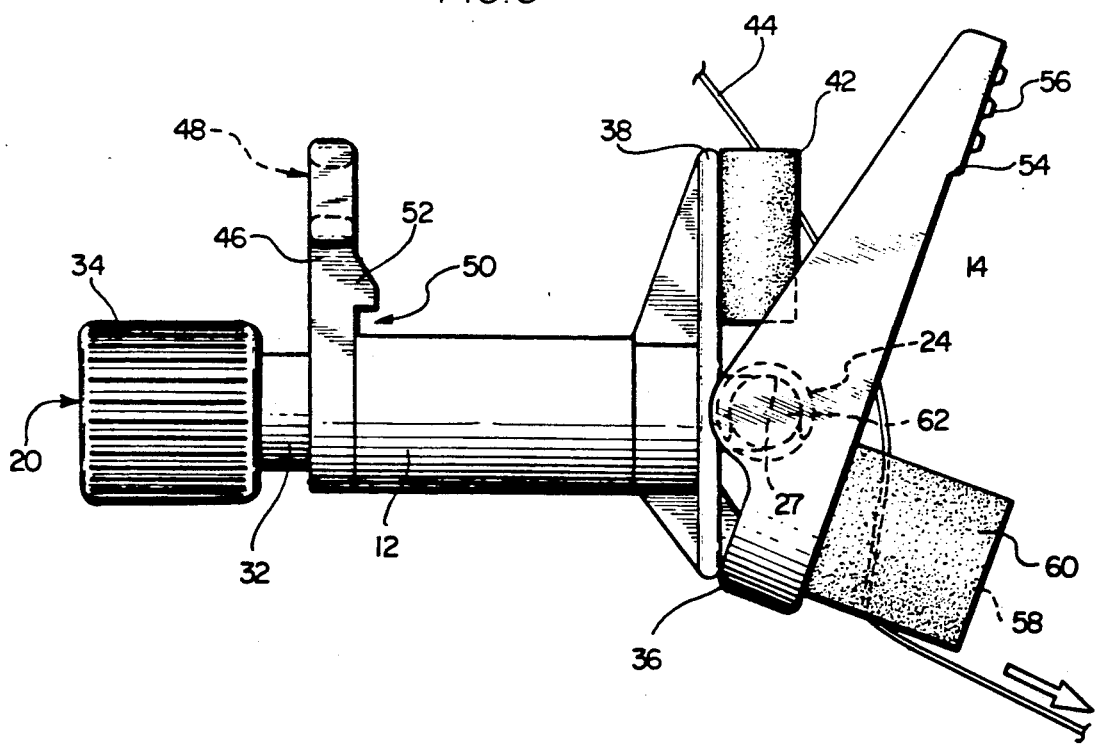
FIG. 5 is a side plan view of a release clip constructed according to the teachings of the present invention with the spool carrier fully pivoted into the open position, showing the disposition of the clip as fishing line plays off of the clip.

To prepare these things, the fisherman begins with a release clip 10 in an open position, similar to that shown in FIG. 5. The fisherman winds the slack line 70 around the spool 60, beginning at the bottom of the spool 60, and finishing at the top of the spool 60. This particular configuration will allow the fishing line 44 to play off of the spool 60 easily, without tangling. When the fisherman has the desired amount of slack line 70 wound around the spool 60, the fisherman rotates the spool carrier 14 about the base 24 of the T bolt 18, similarly to the rotation shown in FIG. 4, into the closed position. The fisherman translates the latch portion 54 of the spool carrier 14 into the notch 50 of the housing 12. The latch 52 of the housing 12 engages the latch portion 54 of the spool carrier 14, and maintains the release clip 10 in the closed position—FIG. 2 and FIG. 3. In this regard, it should be noted that the compressive forces in the spring 22 tend to move the spool carrier and latch portion to the left as viewed, thereby serving to maintain latch portion 54 in notch 50. At this time, the hollow pad 42 applies a soft compression force to the slack line 70 wound around the spool 60, applying enough force to maintain the position of the slack line 70 on the spool 60, but not enough to deform that line 70. The line 70 is clamped thusly between the soft, hollow pad 42 and the outer layer on the spool 60 which, as noted above, is fabricated from a soft, flexible material.

Now, the fisherman can set the tension necessary to open the release clip 10, thereby releasing the slack line 70. The fisherman does this by applying a rotational force to the handle 34 of the knob 20. This force causes the sleeve 32 of the knob 20 to move along the threads 30 disposed on the stem 26 of the T bolt 18. This engagement causes the sleeve 32 to translate rotatably inside the bore 16 of the housing 12, which allows the barrel 32 to compress variably the spring 22 against the shoulder 28. Compression of the spring 22 causes the spring 22 to apply a force to the barrel 32 directed towards the handle 34 of the knob 20. This force must be overcome in order for the spool carrier 14 to translate forward to release the latch portion 54 from the constraints of the notch 50 and the latch 52, thereby allowing the spool carrier 14 to rotate into the open position. This force is directed opposite to tension in the fishing line 44, and therefore, determines the amount of tension necessary to open the release clip 10. With this being done, the fisherman can now mount the release clip 10, by means of the mounting portion 46 and apertures 48, onto an outrigger 66, and begin fishing.

Referring to FIG. 1, a fishing boat 64 is shown trolling for big game fish. This boat 64 is using four fishing lines, 44A, 44B, 44C, and 44D attached to their respective outriggers 66A, 66B, 66C, and 66D by means of release clips 10, constructed according to the teachings of the present invention.

The action of the wake caused by the travel of the boat 64 through the sea assures that the fishing lines 44A, 44B, 44C, and 44D will not become tangled while below the surface of the water. With release clips of the prior art, it was necessary to place an amount of slack line 68A and 68D, shown by dotted lines, between the boat 64 and the ends of the outriggers 66A and 66D, for reasons stated above. This is undesirable because of the danger of sacrificing the structural integrity of the fishing lines 44A and 44D, possibly resulting in breakage of those lines when a fish begins to fight. With the use of the release clip 10 of the present invention the amount of slack line 70A and 70D between the boat 64 and the release clip 10 is reduced significantly, because the bulk of the slack line 70 is in place on the spool 60. This results in greater probability that fish strikes will lead to a caught fish because the probability that the fishing lines will break will be reduced.

Referring to FIG. 4, when a fish strikes the fishing line 44, and applies the necessary, pre-determined tension to the fishing line 44, the tension overcomes the opposing force applied by the spring 22, translating the entire spool carrier 14, and T bolt 18 forward. This movement causes the latch portion 54 to move out of the notch 50, and frees the latch portion 54 from the constraints imposed by the notch 50 and the latch 52.

The spool carrier 14 is now free to rotate about the base 24 of the T bolt 18, under the influence of the force imparted by the tension present in the fishing line 44 due to the presence of the bait fish. The spool carrier 14 rotates into the open position, as shown in FIG. 5. The spool carrier 14 is restricted in its rotation by the stop portion 36 of the housing 12. The spool carrier 14 comes into contact with the stop portion 36, which prevents the spool carrier 14 from rotating beyond a certain limit. The stop portion 36 also supplies support to the spool carrier 14, so that neither the spool carrier 14, nor the release clip 10 are damaged due to the tension present on the fishing line 44. In the open position, the central axis of the spool 60 points along the direction of the tension applied to the fishing line 44 due to the fish. This allows the slack line 70 to play off of the spool 60 freely, without tangling the line 44.

As can be appreciated from the discussion above, in the open position of FIG. 5 of the release clip 10, the slack line 70 will play off of the spool 60, and thus produce the desired degree of "drop back" for the bait. Once the line 70 has played off of the spool 60, the line is no longer affixed to the outrigger. This allows the game fish sufficient time to take the bait. Once the slack provided by the line 70 is used up, the movement of the boat will set the hook in the game fish.

The outriggers 66A, 66B, 66C, and 66D are mounted pivotally to the boat 64, and, as such, can be pivoted into position to re-attach a line to the release clip 10, as needed. In this regard, the clip 10 is manually opened, and the slack line 70 is wound onto the spool 60. Once completed, the spool carrier 14 is pivoted to the FIG. 3 position, and the latch portion 54 is disposed in the notch 50. As discussed above, the hollow pad 42 and the spool 60 now will provide sufficient clamping force on the line, and will prevent any damage thereto.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A release clip for use with big game fishing comprising: a housing having a bore; a T bolt having a base and a stem; the stem being disposed substantially within the bore, and the base being disposed outside of the bore; a spool carrier being rotatably mounted on the base of said T bolt so that the spool carrier can rotate between a closed and an open position; the spool carrier including a spool; the spool being constructed so that fishing line can be wound upon it; and the spool carrier being capable of rotation about said base under the influence of tension applied to the fishing line, so that the fishing line can play off of the spool.

2. A release clip for use with big game fishing according to claim 1 wherein a pad is disposed about the housing; and the pad being capable of confronting the spool when the release clip is in the closed position so as to apply a soft compression to the fishing line, when the fishing line is disposed about the spool, to maintain the disposition of the fishing line about the spool.

3. A release clip for use with big game fishing according to claim 2 wherein a latch portion is disposed about the spool carrier, and a notch and a latch are disposed about the housing; one edge of the notch defining the latch; the notch being of sufficient size to accept the latch portion; and the notch, the latch, and the latch portion comprising locking means for maintaining the release clip in a closed position.

4. A release clip for use with big game fishing according to claim 2 wherein the housing is elongated to form a mounting portion to facilitate mounting of the release clip to an outrigger.

5. A release clip for use with big game fishing according to claim 2 possessing means for determining the magnitude of tension necessary to be applied to the fishing line to cause the spool carrier to rotate from a closed to an open position, and allow the fishing line to play off of the spool.

6. A release clip for use with big game fishing according to claim 2 wherein the means for determining the magnitude of tension necessary to be applied to the fishing line to cause the spool carrier to rotate from a closed to an open position comprises a variably compressible spring; the spring being disposed within the bore surrounding the stem of the T bolt at certain locations; the bore having a diameter that decreases at one end of the bore to form a projection; the diameter of the bore at that end being of such a size that the bore can accept only the stem of the T bolt; the T bolt having threads disposed about the stem; a knob having a barrel and a handle; the barrel having portions disposed within the bore, and the handle being disposed outside of the bore; the barrel having portions being capable of engaging the threads on the stem, and having portions capable of compressing the spring; the handle being constructed so as to be able to accept the application of a force; the force causing the barrel to threadibly engage the stem; and portions of the barrel, under the influence of the force, being capable of variably compressing the spring against the projection.

7. A release clip for use with big game fishing according to claim 2 wherein the housing is elongated to form a stop portion; the stop portion being capable of contacting the spool carrier when the spool carrier is in an open position; and the stop portion being capable of preventing the spool carrier from rotating beyond a certain point, and of supplying support to the spool carrier when the spool carrier is in the open position.

8. A release clip for use with big game fishing comprising: a housing and a spool carrier; the spool carrier being rotatably mounted with respect to the housing so that the spool carrier can rotate between a closed and an open position; the spool carrier including a spool; the spool being constructed so that fishing line can be completely wound about it; the spool being capable of conjoint rotation with the spool carrier with respect to the housing under the influence of tension applied to the fishing line, so that the fishing line can play off of the spool without tangling; the housing including a clasp portion defined by a pad; and the pad confronting the spool when the release clip is in the closed position so as to apply a soft compressive force to the fishing line to maintain the disposition of the fishing line about the spool.

9. A release clip for use with big game fishing according to claim 8 comprising latch means which include a latch portion formed on the spool carrier, and a notch on the housing; the notch being of sufficient size to accept the latch portion; and the notch, and the latch portion comprising the latching means for releasably maintaining the release clip in a closed position, yet permitting movement thereof to an open position upon the application of tension to the line.

10. A release clip for use with big game fishing according to claim 8 wherein the housing is elongated to form a mounting portion to facilitate mounting of the release clip to an outrigger.

11. A release clip for use with big game fishing according to claim 8 including means for adjusting the magnitude of tension necessary to be applied to the fishing line to cause the spool carrier to rotate from a closed to an open position, and allow the fishing line to play off of the spool.

12. A release clip for use with big game fishing according to claim 11 wherein the means for adjusting the magnitude of tension necessary to be applied to the fishing line to cause the spool carrier to rotate from a closed to an open position comprises a variably compressible spring.

13. A release clip for use with big game fishing according to claim 8 wherein the housing includes a stop portion; the stop portion being capable of contacting the spool carrier when the spool carrier is in an open position; and the stop portion being capable of preventing the spool carrier from rotating beyond a certain point, and of supplying support to the spool carrier when the spool carrier is in the open position, while line is playing off of the spool.

14. A fishing line release clip, comprising: a housing element defining a through bore, and including a clamp portion; a stem received in the housing bore; a spool carrier member pivotally mounted to one end of the stem, and including a spool portion for receiving a section of fishing line wound thereon; latch means on the housing and the spool carrier; the latch means including spring means, and, when engaged, the latch means is adapted releasably to maintain the spool portion in engagement with the clamp portion on the housing element, such that the application of tension to a section of the fishing line wound on the spool portion will cause the spool carrier member and the stem to move against the bias of the spring means to disengage the latch means, and permit the spool carrier member to pivot, thereby moving the spool portion away from the clamp portion, such that the fishing line wound upon the spool portion will play off of the spool portion.

15. A fishing release clip according to claim 14, further including means for adjusting the biasing force of the spring means.

16. A fishing release clip according to claim 15 wherein the means for adjusting the biasing force of the spring means includes a knob member having an internally threaded barrel mounted to a threaded end of the stem opposite to that upon which the spool carrier is pivoted, the barrel extending internally of the housing, a shoulder provided in the housing bore, a spring member engaged with the shoulder, and the knob barrel, and compressed therebetween to apply a biasing force to the stem to which the knob is affixed, whereby, upon rotation of the knob, the relative position thereof with respect to the stem may be adjusted to adjust the degree of compression of the spring member.

17. A fishing release clip according to claim 14 wherein the clamp portion is provided by a hollow tubular element to apply a soft compressive force to the line on the spool.

18. A fishing release clip according to claim 17 wherein the spool portion includes a soft covering.

19. A fishing release clip according to claim 14 wherein the housing further includes means for mounting the clip to an outrigger.

* * * * *